United States Patent [19]

Casagrande

[11] Patent Number: 5,782,497
[45] Date of Patent: Jul. 21, 1998

[54] LITE-LIFT DRY LAMINATE: FORM WITH INTEGRAL CLEAN RELEASE CARD

[76] Inventor: Charles L. Casagrande, 423 S. Elmwood, Aurora, Ill. 60506

[21] Appl. No.: 756,397

[22] Filed: Sep. 20, 1996

[51] Int. Cl.⁶ .................................................. B42D 15/00
[52] U.S. Cl. .................................. 283/110; 283/107
[58] Field of Search ........................... 283/79, 80, 81, 283/101, 105, 107, 110, 111

[56] References Cited

U.S. PATENT DOCUMENTS

| | | | |
|---|---|---|---|
| 4,425,386 | 1/1984 | Chang | 427/256 |
| 4,854,610 | 8/1989 | Kwiatek | 283/81 |
| 5,318,326 | 6/1994 | Garrison | 283/101 |
| 5,328,538 | 7/1994 | Garrison | 156/249 |
| 5,401,060 | 3/1995 | Chang et al. | 283/95 |
| 5,431,452 | 7/1995 | Chang et al. | 283/95 |
| 5,466,013 | 11/1995 | Garrison | 283/107 |

FOREIGN PATENT DOCUMENTS

WO 95/20493  8/1995  WIPO.

*Primary Examiner*—Willmon Fridie, Jr.
*Attorney, Agent, or Firm*—Brinks Hofer Gilson & Lione

[57] ABSTRACT

A form with an integrated clean release, diecut, removable card, which includes a multi-layer lamination of translucent paper of film, thin cast film, and paper.

5 Claims, 1 Drawing Sheet

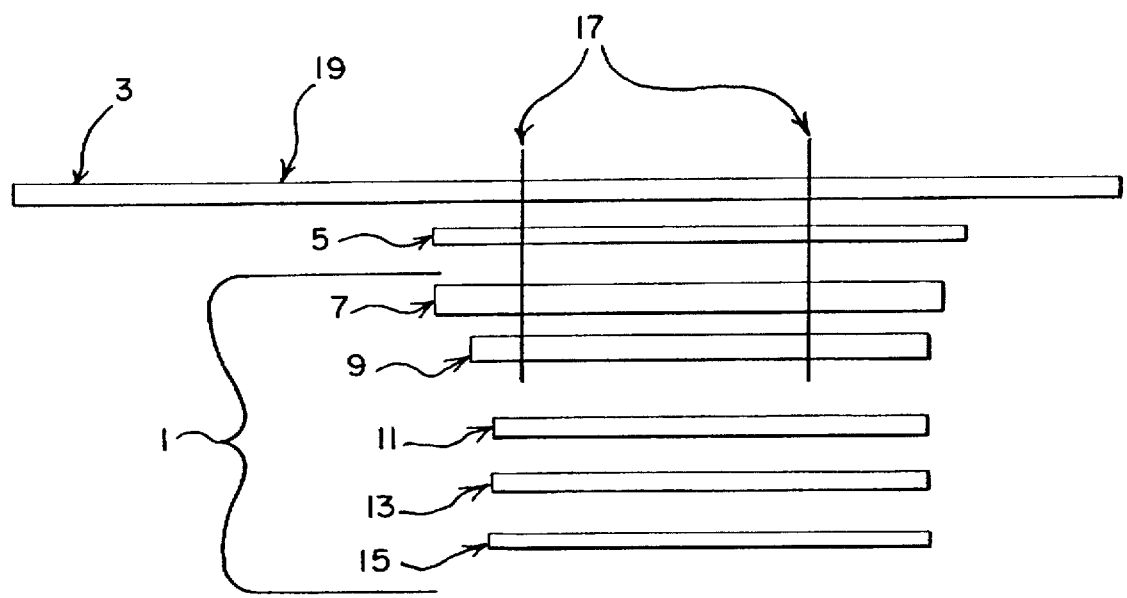

LITE-LIFT DRY LAMINATE: FORM WITH INTEGRAL CLEAN RELEASE CARD

CROSS-REFERENCES TO RELATED APPLICATIONS

This application claims the benefit of U.S. provisional application Ser. No. 60/004,641 filed Sep. 22, 1995, for and on behalf of the inventor, Charles Casagrande.

BACKGROUND OF INVENTION

1. Field of the Invention

This invention relates generally to an improved business form with integral clean release removable cards.

2. Background Information

The use of business forms with removable cards has become commonplace. Examples include insurance cards, membership cards, business cards and telephone cards. Such forms exhibit numerous beneficial characteristics including offering the sender more efficient and convenient ways to (1) imprint the form and card quickly and easily with automatic printing equipment; (2) imprint more information on the form than would fit on the card alone; and (3) handle and ship the cards.

One type of removable card is known as a coupon or clean release card. These cards, when removed from the form, exhibit clean surfaces on the card with no tackiness or residue on the card. Also, the adhesive area of the form, which previously retained the card is covered up in some way so as to be non-tacky.

Previously, clean release card and form combinations were non-integral and had the card "piggybacked" on the form. In these combinations, the cards utilized an additional release liner and were produced with a label press. The cards were then affixed to the forms in a separate step. These forms had the obvious disadvantage of requiring that the cards be produced separately from the forms on a different piece of equipment and then later assembled onto the forms.

Forms with integral cards are created by diecutting or otherwise defining the card within the form itself. Thus, the form becomes part of the card lamination and is therefore referred to as the form layer. This results in a card and form combination which is much thinner than the piggyback type since the form layer actually is part of the card. However, the card must be retained within the form layer through the processes of printing, shipping, handling and other operations, until it is ultimately removed by the consumer. Currently, forms with integral clean release cards are produced using a single layer of splittable varnish or dry adhesive to retain the card within the form layer.

These products exhibit numerous problems. First, the card can be very difficult to remove since the card material is in the same plane as the form layer itself. Second, these forms can have compatibility problems with many laser printers since these fir products exhibit a tendency to build up static electricity and even melt when passed though such printers. At the least, such tendencies result in inconsistent release of the card from the form. Finally, the release characteristics of the cards from the form are inconsistent due to the characteristics of the splittable varnish or dry adhesive.

Reference is made to U.S. Pat. Nos. 5,466,013; 5,318,326; and 4,854,610.

The present invention employs a thin cast film connected to the card which transfers to an underlying adhesive layer which is connected to a base paper layer. The transfer of the thin cast coating to the adhesive layer upon removal of the card covers the adhesive and creates a non-stick surface on the back of the card and on the area of the form which held the card. Unlike the current integral cards, the present invention also has the adhesive layer applied in a pattern coat to yield areas on the left and right sides of the card which are free from adhesive. This pattern coating creates adhesive voids on the sides of the card called lift-edges which provide the user with an easily obtainable grip on the card. This guarantees easy and consistent release of the card from the form. The invention exhibits excellent compatibility with laser printers such that the heat and static generated by such devices does not compromise the integrity of the invention or the consistency of the card release.

Other objects, features and advantages of the invention will be in part apparent and in part pointed out hereinafter.

BRIEF DESCRIPTION OF THE DRAWING

The invention is described in conjunction with the accompanying drawing.

FIG. 1, which is an enlarged cross sectional view of the invention.

DESCRIPTION OF THE PREFERRED EMBODIMENT

Referring to the accompanying drawing, the invention is seen in cross-section as a laminate, 1, attached to the bottom of a form layer, 3. It is understood that the topside of Layer 3 designated 19 may contain writing, graphics or other indicia.

The layers of the invention are labeled 5, 7, 9, 11, 13, and 15, and are described as follows. Layer 5 is a release liner which is removed to expose Layer 7. Layer 7 is an adhesive layer which bonds laminate, 1, to the underside of the form layer, 3. Layer 9 is a translucent film or paper layer, the topside of which is in contact with Layer 7. Layer 11 is a thin cast coating which is applied to the underside of Layer 9.

Layer 13 is a second adhesive layer which bonds Layer 15, the base paper layer, to the preceding layers. The card is defined in the form by a diecut, 17, extending through the form Layer 3, and Layers 7 and 9 of the laminate, 1, to but not through Layer 11.

In one embodiment of the invention, Layers 5, 7 and 9 are supplied as a one piece laminate, commonly referred to in the industry as "coupon base" and available from companies such as Emulsion Technologies in Medina, Ohio. Thus, the release liner, Layer 5, serves to cover the adhesive Layer 7 prior to the application of the coupon base to the underside of the form layer, 3, at which time Layer 5 is removed and laminate, 1, is adhered to Layer 3. Layer 9 is a translucent film or paper. Layers 11, 13 and 15 are laminated to the coupon base.

In another embodiment, the coupon base is omitted in favor of independent Layers 7 and 9. Layer 9 is again composed of translucent film or paper. The Layer 7 adhesive is applied to the top side of Layer 9 and the balance of the inventive lamination, Layers 9, 11, 13 and 15, is adhered to the bottom side of the form layer, 3. Since a separate coupon base is not used, Layer 5 is not used in this embodiment.

In all embodiments, the Layer 11 coating has a greater affinity for the adhesive of Layer 13 than the film or paper of Layer 9, which enables the separation of Layer 9 from Layer 11 upon removal of the card with Layer 11 remaining attached to Layer 13.

Another aspect of the invention is that the adhesive of Layer 13 may be applied in a pattern such that no adhesive is applied under the left and right edges of the card to create the lift-edges. Without adhesive under the edges of the card, the card is easier to grab and remove by the consumer. Also, the lift-edges ensure a consistent and clean release of the card.

Finally, in the preferred embodiment, Layer 15 is paper stock, generally of 25-30# weight. This layer adds support for the layers above it while helping to prevent static and heat related problems. Moreover, the paper layer prevents the lamination from melting as with other integrated card laminates.

In view of the above, it will be seen that the several objects of the invention are achieved and other advantageous results are attained.

As various changes could be made in the above construction without departing from the scope of the invention, it is intended that all matter contained in the above description shall be interpreted as illustrative and not limiting.

I claim:

1. A laminate, comprising:

a layer of translucent paper or film;

a card, having edges and defined in the translucent layer by a diecut extending through the translucent layer;

a thin cast film layer, disposed on the translucent layer; and a base layer of paper adhesively secured to the thin cast film layer opposite the translucent layer, wherein the thin cast film layer has a greater affinity for the adhesive securing the thin cast film layer to the base layer than for the translucent layer.

2. A form with an integral clean release card, comprising a form layer having upper and lower surfaces;

a translucent paper or film layer, secured to the lower surface of the form layer by a first layer of adhesive;

a card, having edges and defined in the form, first adhesive, and translucent layers by a diecut extending through the form, first adhesive and translucent layers;

a thin cast film layer, disposed on the translucent layer opposite the form layer, having a greater affinity for a second adhesive layer than the translucent layer; and a base layer of paper secured to the thin cast film layer opposite the translucent layer by the second adhesive layer.

3. An article, as in claims 1 or 2, wherein the second adhesive layer is applied in a pattern such that it does not extend under the left and right edges of the card.

4. An article, as in claims 1 or 2, wherein the translucent layer is a polyester film, 0.5 to 7 mils thick.

5. An article, as in claims 1 or 2, wherein the base layer of paper is paper stock of 25 to 30 # weight.

* * * * *

UNITED STATES PATENT AND TRADEMARK OFFICE
CERTIFICATE OF CORRECTION

PATENT NO. : 5,782,497
DATED : July 21, 1998
INVENTOR(S) : Charles L. Casagrande It is certified that error appears in the above-identified patent and that said Letters Patent is hereby corrected as shown below:

On the Title Page

In column 1, after line 1, under "U.S. PATENT DOCUMENTS", please insert:

--5,362,106  11/1994    Longtin       283/109--

Signed and Sealed this

Twenty-first Day of November, 2000

Attest:

Q. TODD DICKINSON

*Attesting Officer*  *Director of Patents and Trademarks*